106-90   AU 115   EX
5/31/77   XR   4,026,723

United States Patent [19]
Grof et al.

[11] 4,026,723
[45] May 31, 1977

[54] ADMIXTURE OF ALKALI-METAL NITRATE WITH WATER-SOLUBLE CONDENSATE OF SULFONATED AROMATIC HYDROCARBON AND ALIPHATIC ALDEHYDE

[75] Inventors: Tibor T. Grof, New Carrollton; Gloven G. De La Cruz, Takoma Park, both of Md.

[73] Assignee: Arcal Chemicals, Inc., Seat Pleasant, Md.

[22] Filed: Oct. 30, 1975

[21] Appl. No.: 627,233

[52] U.S. Cl. .................... 106/315; 106/90
[51] Int. Cl.² ........................ C04B 13/00
[58] Field of Search ............... 106/90, 315

[56] References Cited
UNITED STATES PATENTS

| | | | |
|---|---|---|---|
| 1,972,208 | 9/1934 | Tucker | 106/90 |
| 2,141,569 | 12/1938 | Tucker | 106/90 |
| 2,390,138 | 12/1945 | Vallandigham | 106/38.3 |
| 3,582,376 | 6/1971 | Ames | 106/90 |
| 3,677,780 | 7/1972 | Nishi et al. | 106/314 |

*Primary Examiner*—Patrick P. Garvin
*Assistant Examiner*—John P. Sheehan
*Attorney, Agent, or Firm*—Berman, Aisenberg & Platt

[57] ABSTRACT

A composition comprising a major proportion of alkali-metal nitrate and a minor proportion of water-soluble condensate of sulfonated aromatic hydrocarbon with aliphatic aldehyde has a synergistic effect in accelerating the rate of set of concrete to which it is added.

20 Claims, No Drawings

ADMIXTURE OF ALKALI-METAL NITRATE WITH WATER-SOLUBLE CONDENSATE OF SULFONATED AROMATIC HYDROCARBON AND ALIPHATIC ALDEHYDE

BACKGROUND OF THE INVENTION

Calcium chloride, a classical concrete-set accelerator, promotes (in the concrete) a continuous oxidation of ferrous structural or reinforcing steel or aluminum (conduits) embedded therein. It also adversely influences the concrete itself in the form of resulting cracking, spalling and weakening; it increases the attack of sulfates in soil. Generally, the maximum amount of calcium chloride used per bag (94 pounds) of cement is two pounds.

Naphthalene sulfonic acid condensates (with iso-propyl or iso-butyl alcohol) were suggested by Nelson [U.S. Pat. No. 1,863,990] as additives to wall plasters and mortars to reduce surface tension, improve wetting, increase plasticity and improve working.

Tucker [U.S. Pat. Nos. 1,972,207, 1,972,208 and 2,141,569] disclosed (naphthalene sulfonic acid)/formaldehyde condensates to enhance the hue of colored calcareous substances; the last-cited patent expanded the condensate to include those wherein the naphthalene sulfonic acid is replaced by other aromatic sulfonic acids, such as those of benzene, of diphenyl, of phenanthrene and of anthracene, and the resulting concrete or cement additive was suggested to reduce the amount of required water and to increase the strength of hardened concrete. Tucker provided a synthesis for his condensates which were later [U. S. Pat. No. 2,690,975] recognized as "Tucker's condensation product" or "Tucker C-P."

In connection with maintaining a stable suspension or assisting flow of a cement slurry, Wertz [U.S. Pat. No. 2,313,107] warned that any condensate of formaldehyde with a polynuclear aromatic sulfonic acid should be used in very small quantities. MacPherson [U.S. Pat. No. 2,478,831] acknowledged the condensation product of naphthalene sulfonic acid and formaldehyde as a cement dispersing agent. Scripture [U.S. Pat. No. 2,690,975] reported that Tucker's condensation product and its many variants do reduce the amount of water required to produce a cement mix having a given plasticity, but do not materially increase the ultimate strength of the hardened cement mix; they have little or no effect on early strengths at from 1 to 3 days. Scripture also stated that Tucker's condensation product and its variants have met with substantially no commercial success and proposed a comnination of such condensation product (cf. column 5, last complete paragraph) with desugarized waste sulfite liquor solids to reduce finishing time and improve early rate of gain of strength.

Benedict [U.S. Pat. No. 2,927,033] proposed Tucker's condensation product as one ingredient in a four-component cement additive, which also includes solids of waste sulfite liquor, water-soluble chloride accelerators and water-soluble alkyl amines.

Weisend [U.S. Pat. No. 3,132,693] proposed a mixture [40 to 50 percent by weight of hydroxyethyl cellulose, 2 to 10 percent by weight of 40,000 molecular weight polyvinylpyrrolidone (PVP), and 35 to 58 percent by weight of a sodium salt of a naphthalene sulfonate condensed with formaldehyde for which may be substituted any organic solfonate dispersing agent] which provides a low-water-loss additive for cements. Weis and [U.S. Pat. No. 3,359,225] is directed to another additive [PVP (having an average molecular weight of the order of magnitude of 40,000) combined with the sodium salt of naphthalene sulfonate condensed with formaldehyde and having an average molecular weight of at least 1,500] for Portland-type cements "which reduces the friction encountered as the cement mixture is flowed or pumped into place, and which also permits the utilization of decreased quantities of water in the cement mixture, thus appreciably increasing the strength of the hardened and cured cement."

Hook [U.S. Pat. No. 3,465,825] found that the lithium (or the mixed lithiumsodium) salt of the condensation product (having a molecular weight of between about 500 and 3000) of mononaphthalene sulfonic acid and formaldehyde is a turbulence-inducing agent in aqueous cement slurries containing same. Proell [U.S. Pat. No. 3,537,869] concerns a 3-component [(a) partial fatty acid ester, (b) sulfate of a partial fatty acid ester or partial fatty alcohol ether, and (c) sulfonated condensation product of formaldehyde and a naphthalene or a salt thereof] additive for cementitious mixtures to increase the compressive strength of the hardened product. "Lomar D" ("a condensate of naphthalenesulfonic acids and formaldehyde, offered by the Nopco Chemical Company, Newark, N.J.") is so defined by Proell and is indicated by Ames [U.S. Pat. No. 3,582,376] to be a dispersant in quick-setting cement slurries.

Nishi [U.S. Pat. No. 3,677,780] produces high-strength mortar or concrete by subjecting shaped articles of mortar or concrete [containing a salt of β-naphthalenesulfonic acid-formaldehyde condensate with at least two, and preferably at least five, β-naphthalenesulfonic acid (β-NS) units] to curing in an autoclave. Hattori [U.S. Pat. No. 3,686,133] found that a mixture of (a) a salt of a high molecular condensation product of naphthalene-(α- and β-)sulfonic acid and formaldehyde and (b) a salt of gluconic acid is useful as a cement dispersing agent.

Kitsuda [U.S. Pat. No. 3,788,868] concerns water-soluble salts of condensates (having molecular weights of 1500 to 10,000) obtained by condensing with formaldehyde, sulfonated products of monocyclic or fused polycyclic benzenoid aromatic hydrocarbon compounds having from 1 to 12 benzene rings as cement dispersing agents.

The preceding is not intended to be a comprehensive review of disclosures concerning the use of naphthalenesulfonate/formaldehyde condensates in cement-containing compositions; it is merely indicative of the type of prior art presently known to Applicants.

Sodium nitrate has been suggested [U.S. Pat. No. 2,390,138] as an accelerator, and water-soluble sulfonated-aromatic-hydrocarbon/formaldehyde condensates have been employed as concrete additives [U.S. Pat. No. 1,972,207 and 1,972,208] for over forty years. These two materials, however, are not known to have been previously combined into a single composition for any purpose.

SUMMARY OF THE INVENTION

A combination of (a) alkali-metal nitrate with (b) water-soluble condensate of sulfonated aromatic hydrocarbon and aliphatic aldehyde, preferably formaldehyde, in an admixture containing a larger proportion of (a) than of (b) provides a calcium-chloride-free concrete-set accelerator which significantly decreases water demand and improves workability. The admixture is prepared either in powder (essentially dry) form or as an aqueous (liquid) solution.

In addition to producing higher early compressive strengths in concrete, mortar or other cement compositions in which the subject combination of ingredients has been incorporated, corrosion of imbedded metals is inhibited or eliminated, resulting hardened products are more dense and are not discolored, water requirements are reduced, workability and finishing appearance are improved, and shrinkage is not altered.

The invention is directed to and includes all compositions containing a combination of:
  a. alkali-metal (preferably sodium) nitrate and
  b. water-soluble condensate (e.g., in the form of an alkali-metal, preferably sodium, salt) of sulfonated aromatic (e.g., polycyclic, preferably with fused benzenoid rings) hydrocarbon and aliphatic aldehyde, e.g. formaldehyde in a ratio in which the two ingredients, in admixture, would impart a synergistic set acceleration to a cement composition in which it is incorporated. [This definition naturally assumes the presence in the cement composition of ingredients which permit setting of the cement.] The inventive compositions, e.g., vary from 2-component compositions to aqueous solutions of the noted two components and further include all dry and wet cement-containing compositions both before and after set. The invention additionally includes the use of the inventive compositions to accelerate the hydration cycle of concrete, mortar or other cement-containing material, to reduce setting time, to increase hardness and compressive strength, to improve workability and to decrease oxidation of imbedded metals.

DETAILS

For convenience the essential components will be generically identified as (a) nitrate (alkali-metal nitrate) and (b) C-P (water-soluble condensate whether in free-acid or alkali-metal salt form) or C-PS (water-soluble condensate in the form of an alkali-metal salt). The invention is in a combination of nitrate with C-P and, more particularly, with wuch a combination which has a synergistic effect with regard to improving set-acceleration of cement-containing compositions in which it is incorporated. Product aspects thus include;
  1. admixtures of nitrate with C-P (preferably C-PS) in solid particulate form containing more nitrate than C-P; the proportion of C-P must be sufficient to produce the noted synergistic effect; exemplary ranges are from 25 to 50 parts by weight of nitrate to from 3 to 15 parts by weight of C-P and include at least the scope of ratios [C-P/nitrate] from 3:50 to 15:25, the weight ratio of about 1:8 being preferred;
  2. aqueous solutions of (1) containing, e.g., from about 40 to about 65 percent by weight of water; the precise amount of water is not critical; it should be adequate to dissolve the essential ingredients and should not contain such an excess as to preclude appropriate admixture with a cement-containing composition; for handling and transportation, the amount of water should be kept close to the minimum required to maintain the essential ingredients in solution;
  3. dry compositions containing cement and (1) with, e.g., from about 1 to about 3.1 parts by weight of (1) per 100 parts by weight of cement, generally with from 1.83 to 2.13 or even to 2.39 parts by weight of (1) per 100 parts by weight of cement and preferably with about 2.02 parts by weight of (1) per 100 parts by weight of cement; these compositions include both particulate materials prior to incorporation of liquid and setting or curving and finished solid structures wherein the cement has been cured or set; and
  4. wet settable or curable compositions containg liquid, e.g. water, and (1).

In the broadest aspect of this invention C-P includes all of the water-soluble (sulfonated aromatic hydrocarbon)/(aliphatic aldehyde) condensations referred to in the previously-cited Tucker, Weisend, Scripture, Hook, Nishi, Hattori and Kitsuda patents, but those condensates wherein the aromatic hydrocarbon has more than one benzenoid ring are significantly superior, and those wherein the aromatic hydrocarbon is naphthalene (NC-P) are preferred. The C-PS disclosed by Richter [U.S. Pat. No. 3,067,243], however, is the C-P of choice; it is described as a salt-free salt of (naphthalene sulfonic acid) - formaldehyde condensate and will be referred to hereafter as salt-free NC-PS.

Although sodium nitrate may impart a slight set acceleration to a cement-containing composition in which it is incorporated, such acceleration is far lower than the requirements of ASTM C-494. C-P provides neither acceleration nor retardation for cement-containing compositions of which it is a part. The set acceleration achieved by the admixture of nitrate with C-P and/or the separate incorporation or both of these ingredients in a cement-containingcomposition was therefore not previously apparent.

All four cited product aspects of this invention can be calcium-chloride free, or even completely chloride free, and such freedom from chloride is particularly advantageous. Product aspect (2) is the only calcium-chloride-free concrete-set accelerator presently known to be available in liquid form, and product aspect (1) is readily incorporated in cement-containing batch mixes to obtain consistently-uniform favorable results.

The aqueous solutions (2) are useful (for set acceleration of cement-containing compositions, e.g., concrete) over a range, e.g., of from 2 to 60 ounces per bag [94 pounds] of cement. Products (1) and (2) impart an excellent plasticizing effect to batches of cement-containing mixes containing them; they prevent or reduce leeching and remarkably increase the compressive strength of resulting finished products.

The following examples illustrated preferred embodiments and provide comparative data. They are not limitative in any way and are to be construed as merely exemplary.

EXAMPLE 1

| Ingredient | Dry Particulate Powder Compositions | | | |
| --- | --- | --- | --- | --- |
| | I | II | III | IV |
| NaNO$_3$ | 8 | 5 | 50 | 14 |
| Lomar D [NC-PS] | 1 | 3 | 3 | 3 |

The preceding table indicates the relative parts by weight of each of the stated ingredients in each of the formulations. For three parts by weight of NC-PS (sodium salt) the sodium nitrate varies from 5 to 50 parts by weight. Formulation I is preferred. Approximately 1.897 pounds of formulation I is employed per bag (94 pounds) of cement to effect optimum set acceleration and hardening for essentially any cement-containing composition. The optimum for other formulations varies somewhat from this figure.

Normal concrete mixes contain about 200 pounds of sand, about 400 pounds of gravel and about 6 gallons of water per 100 pounds of cement. Cement-containing mortar has a 1:3 volume ratio of slaked lime to sand. [Cement is used throughout the present disclosure and claims (unless otherwise limited) as a substance made from powdered lime and clay which, after being mixed with water, will harden like stone when it dries. It includes, e.g., hydraulic, such as portland, cement and refractory cement.]

When one of the formulations I through IV is incorporated in a cement-containing composition, the amount of water employed is reduced. For normal concrete mixes to which 1.897 pounds of such formulation, e.g. formulation I, are added, the amount of water is thus reduced from 6 to 5.4 gallons per bag of cement.

EXAMPLE 2

| Ingredient | Calcium-Chloride-Free Liquid Set-Accelerating Compositions | | | |
|---|---|---|---|---|
| | I | II | III | IV |
| $NaNO_3$ | 40 | 25 | 50 | 35 |
| Lomar D | 5 | 15 | 3 | 7.5 |
| Water | 55 | 60 | 47 | 57.5 |

As in Example 1 the figures signify the relative parts by weight of each of the noted ingredients in the exemplary formulations. In this example, however, the figures also reflect the weight percentage of each ingredient in the liquid composition. From 24 to 55 fluid ounces (about 0.71 to about 1.63 liter) of any of the noted liquid formulations [the preferred range being from 42 (about 1.24 liters) to 49 (about 1.45 liters) fluid ounces and the preferred amount being 46.5 (about 1.38 liters) fluid ounces] is advantageously employed per bag of cement in any cement-containing formulation as a set accelerator. The overall amount of water required is reduced in the same proportion as indicated in Example 1 when dry compositions according to this invention are employed. The liquid compositions are used in the same manner as the dry compositions, but they have the advantage of easier uniform incorporation in cement-containing admixtures which already contain some water.

Either or both of the ingredients can be premixed with sand, lime or cement before the latter is incorporated in the desired cement-containing composition. Alternatively, an appropriate proportion of either $NaNO_3$ or Lomar D (dry or in aqueous solution) is first added to a cement-containing (dry or water-containing) admixture and then the other of these ingredients is incorporated in the resulting admixture; the order of addition is inconsequential insofar as the instant invention is concerned. For uniformity and consistency of results the second or both of these ingredients are incorporated into a cement-containing composition with the first addition of water thereto.

EXAMPLE 3

| Ingredient | Cement-Containing Compositions | | | | | |
|---|---|---|---|---|---|---|
| | I | II | III | IV | V | VI |
| $NaNO_3$ | 1.69 | 1.69 | 1.69 | 1.69 | 1.69 | 1.69 |
| Lomar D | 0.21 | 0.21 | 0.21 | 0.21 | 0.21 | 0.21 |
| Cement | 94 | 94 | 94 | 94 | — | — |
| Water | — | 50.8 | 50.8 | 50.8 | — | 50.8 |
| Sand | — | — | 188 | 188 | 70.5 | 70.5 |

EXAMPLE 3-continued

| Ingredient | Cement-Containing Compositions | | | | | |
|---|---|---|---|---|---|---|
| | I | II | III | IV | V | VI |
| Gravel | — | — | — | 376 | — | — |
| Slaked Lime | — | — | — | — | 23.5 | 23.5 |

In each of the immediately-preceding formulations the ratio of $NaNO_3$ to Lomar D is essentially 8:1. The total parts by weight of these two ingredients is readily replaced by a combination of the same ingredients in any of the other proportions reflected in Example 1.

Sodium nitrate in each of Examples 1 through 3 is replaced by an equivalent of another alkali-metal, such as lithium or pottassium, nitrate (or a combination of such nitrates) with similar set-acceleration results. Likewise, replacing the Lomar D with any of the water-soluble [sulfonated aromatic (having at least two benzenoid rings) hydrocarbon]/formaldehyde condensates referred to in the previously-cited Tucker, Weisend, Scripture, Hook, Richter, Nishi, Hattori and Kitsuda patents, particularly those in alkali-metal (preferably sodium) salt form, results in compositions having comparable set-accelerated properties; corresponding C-P wherein the aromatic hydrocarbon has only one benzenoid ring results in a synergistic set acceleration, but not to the same degree as those wherein the aromatic hydrocarbon has more than one benzenoid ring, preferably in condensed-ring form.

EXAMPLE 4

| Ingredient | Comparative Test Formulations | | | |
|---|---|---|---|---|
| | I | II | III | IV |
| Cement (Type I) | 234.2 | 234.2 | 234.2 | 234.3 |
| Sand (Solite) | 602.5 | 602.5 | 602.5 | 602.5 |
| Aggregate (No. 57) | 906.0 | 906.0 | 906.0 | 906.0 |
| Water | 133.5 | 126.8 | 133.5 | 126.8 |
| $NaNO_3$ | | 4.21 | 4.21 | |
| Lomar D | | 0.53 | | 0.53 |

The preceding figures are expressed in kilograms per cubic yard (0.765 cubic meter) and are based on mixes using 5.5 bags of cement. The water/cement ratio is 0.57, but is reduced by 5 percent by volume for formulations containing C-P.

For each formulation prepare concrete specimens in cylinders (6 inches in diameter by 12 inches in height). Cure the specimens in a lead-capped moisture-curing chamber, and determine compressive strengths with a compressive-strength testing machine. Follow all steps for compressive strength (ASTM C-39), air content (ASTM C-231), slump (ASTM C-142), etc., from the corresponding specifications for concrete testing. Comply completely with ASTM C-494 - 71.

| Formulation | Compressive Strengths | | |
|---|---|---|---|
| | 1 Day (psi) | 3 Days (psi) | 28 Days (psi) |
| I (Control) | 1,395 | 2,100 | 3,850 |
| II (Invention)* | 1,895 | 2,810 | 3,960 |
| % increase | 35.8 | 33.81 | 2.85 |
| III ($NaNO_3$)** | 1,620 | 2,408 | 3,800 |
| % increase | 16.4 | 14.6 | −0.013 |
| IV (NC-PS)*** | 1,395 | 2,100 | 3,850 |
| (No Acceleration - Positive Water Reduction)*** | | | |

*The $NaNO_3$ and Lomar D are incorporated in the formulation in the form of Composition I of Example II (46.5 fluid ounces per bag of cement).
**The $NaNO_3$ is incorporated in the formulation in the form of a 40% aqueous solution (46.5 fluid ounces per bag of cement).
***The Lomar D is incorporated in the formulation in the form of a 5% aqueous solution (46.5 fluid ounces per bag of cement).

EXAMPLE 5

| Ingredient | More Formulations | | | |
|---|---|---|---|---|
| | I | II | III | IV |
| Cement (Type I) | 234.2 | 234.2 | 34.2 | 234.2 |
| Sand (Solite) | 602.5 | 602.5 | 602.5 | 602.5 |
| Aggregate (No. 57) | 906.0 | 906.0 | 906.0 | 906.0 |
| Water | 126.8 | 126.8 | 126.8 | 126.8 |
| Sodium Nitrate | 2.17 | 2.89 | 4.21 | 4.98 |
| Lomar D | 0.27 | 0.36 | 0.53 | 0.62 |

As in the formulations of Example 4 the preceding figures are expressed in kilograms per cubic yard and are based on mixes using 5.5 bags of cement. The combined sodium nitrate and Lomar D are incorporated in each formulation in the form of Composition I of Example 2 [24 fluid ounces per bag for Formulation I; 32 fluid ounces per bag for Formulation II; 46.5 fluid ounces per bag for Formulation III; 55 fluid ounces per bag for Formulation IV].

| Formulation | One-Day Compressive Strengths [pounds per square inch (psi)] | |
|---|---|---|
| | Compressive Strength | Percent Increase |
| Control* | 1,395* | — |
| I | 1,671 | 19.8 |
| II | 1,770 | 26.9 |
| III | 1,895 | 35.8 |
| IV | 1,898 | 36.1 |

*The Control is Formulation I of Example 4, and the 1-Day Compressive Strength is that reflected in Example 4.

EXAMPLE 6

| Formulation* | Control | Invention** |
|---|---|---|
| Ingredient | | |
| Cement (Atlas Portland - Type I) | 517 pounds | 517 pounds |
| Fine Aggregate (Sand - ASTM C-33) | 1330 pounds SSD | 1330 pounds SSD |
| Course Aggregate (No. 57 Crushed Stone-ASTM C-33) | 2000 pounds SSD | 2000 pounds SSD |
| Water | 276.5 pounds (33.1 gallons) | 248.04 pounds (29.8 gallons) |
| Air-Entraining Agent | — | — |
| Accelerator (Composition I of Example 1)*** | — | 10.43 pounds |
| Properties of Freshly-Mixed Concrete | | |
| Slump, in. | 2 | 1.75 |
| Air Content, percent by volume | 2.5 | 2.5 |
| Concrete Temperature, °F s | 78 | 78 |
| Plastic Unit Weight, pound per cubic foot | 152.9 | 153.9 |
| Yield, cubic feet | 2.5 | 2.5 |
| Water/Cement Ratio, gallons per bag | 6 | 5.4 |
| Initial Time of Set (ASTM C-403), hr.:min. | 4:49 | 3:49 |
| Properties of Hardened Concrete | | |
| Compressive Strength (ASTM C-39), psi | | |
| Age, days | | |
| 1 | 1430 | 1890 |
| 1 | 1430 | 2040 |
| 3 | 2210 | 2820 |
| 3 | 2160 | 2980 |
| 7 | 2650 | 3400 |
| 7 | 2560 | 3250 |
| 28 | 3940 | 4020 |
| 28 | 3920 | 4090 |
| Flexural Strength (ASTM C-78), psi | | |
| Age, days | | |
| 28 | 620 | 625 |
| 28 | 600 | 635 |
| Length Change (ASTM C-78), percent | | |
| Age, days | | |
| 28 (laboratory cured) | +0.001 | +0.001 |

*The mix designation for each formulation: 5.5 bag (Non air-entrained), 3000 psi.
**Type C Admixture.
***The accelerator is incorporated into the admixture as 46.5 ounces per bag of cement of the aqueous solution defined by Composition I of Example 2.

The invention and its advantages are readily understood and appreciated from the foregoing description. Various changes may be made in the compositions and procedures without departing from the spirit and scope of the invention or sacrificing its material advantages. The procedures, compositions and uses hereinbefore described are merely illustrative of preferred embodiments of the invention.

What is claimed is:

1. An essentially dry particulate cement-set accelerating composition comprising alkali-metal nitrate and a water-soluble member selected from the group consisting of:
   a. (sulfonated aromatic hydrocarbon)/(aliphatic aldehyde) condensate and
   b. an alkali-metal salt of (a), the composition having a greater weight percentage of the alkali-metal nitrate than of the water-soluble member, the components being present in a ratio sufficient to impart a synergistic set acceleration to a cement composition.

2. A composition according to claim 1 wherein the sulfonated aromatic hydrocarbon has at least two benzenoid rings and the aliphatic aldehyde is formaldehyde.

3. A composition according to claim 2 wherein the aromatic hydrocarbon is naphthalene and the water-soluble member is (b).

4. A composition according to claim 3 wherein the alkali-metal nitrate is sodium nitrate and (b) is the sodium salt of (a).

5. A composition according to claim 4 wherein the sodium salt of (a) is free from chloride salts.

6. A composition according to claim 4 wherein the sodium salt of (a) is salt free.

7. A composition according to claim 4 having 3 parts by weight of condensate for each 5 to 50 parts by weight of sodium nitrate.

8. A composition according to claim 4 having about 1 part by weight of condensate for each 8 parts by weight of sodium nitrate.

9. In a hardenable cement-containing admixture with a set accelerator, the improvement wherein the set accelerator is a chloride-free composition according to claim 1.

10. A hardenable cement-containing admixture having a set-accelerating proportion of a composition according to claim 2.

11. An aqueous solution of a composition according to claim 3.

12. A solution according to claim 11 having from 40 to 65 percent by weight of water.

13. A composition according to claim 10 in admixture with sufficient water to effect setting of the cement into a hard integral mass.

14. A composition according to claim 10 containing sand.

15. A composition according to claim 10 containing gravel.

16. A composition according to claim 14 containing gravel.

17. A concrete composition according to claim 13.

18. A composition according to claim 4 in admixture with sand and slaked lime.

19. A process for accelerating the set and reducing the water requirement of a hardenable cement-containing admixture which comprises incorporating in the admixture a set-accelerating proportion of a composition according to claim 4.

20. A process for accelerating the set and reducing the water requirement of a hardenable cement-containing admixture which comprises incorporating in the admixture a chloride-free liquid set accelerator which is an aqueous solution of a composition according to claim 4.

* * * * *